United States Patent [19]
Fitzpatrick et al.

[11] Patent Number: 5,262,860
[45] Date of Patent: Nov. 16, 1993

[54] METHOD AND SYSTEM COMMUNICATION ESTABLISHMENT UTILIZING CAPTURED AND PROCESSED VISUALLY PERCEPTIBLE DATA WITHIN A BROADCAST VIDEO SIGNAL

[75] Inventors: Gregory P. Fitzpatrick, Irving; William J. Johnson, Flower Mound; Robert S. Keller, Grapevine; Marvin L. Williams, Lewisville, all of Tex.

[73] Assignee: International Business Machines Corporation, Armonk, N.Y.

[21] Appl. No.: 872,789

[22] Filed: Apr. 23, 1992

[51] Int. Cl.$^5$ ............................................. H04N 5/445
[52] U.S. Cl. ..................................... 358/142; 358/86; 358/147; 379/92; 379/97
[58] Field of Search .................... 379/92, 355, 100; 358/142, 147, 84, 85, 86, 183, 338, 340, 146; 455/6.1, 6.2, 6.3

[56] References Cited

U.S. PATENT DOCUMENTS

| | | | |
|---|---|---|---|
| 4,581,656 | 4/1986 | Wada | 358/438 |
| 4,811,111 | 3/1989 | Kurokawa | 358/440 |
| 4,920,560 | 4/1990 | Kageyama | 358/440 |
| 4,931,870 | 6/1990 | den Hollander | 358/147 |
| 4,939,767 | 7/1990 | Saito et al. | 358/85 |
| 4,975,948 | 12/1990 | Andresen et al. | 379/355 |
| 5,162,924 | 11/1992 | Saito | 358/440 |
| 5,200,823 | 4/1993 | Yoneda et al. | 358/147 |
| 5,202,759 | 4/1993 | Laycock | 358/86 |

OTHER PUBLICATIONS

W. E. Bennett and F. K. Rodgers; Computer Video Signals For Computer Usage, Jan. 1989; Kenneth Mason Publications Ltd. England; No. 297.

*Primary Examiner*—Mark R. Powell
*Assistant Examiner*—Jeffrey S. Murrell
*Attorney, Agent, or Firm*—Andrew J. Dillon

[57] ABSTRACT

A method and system are disclosed for capturing and processing visually perceptible data, such as address or telephone numbers, within a broadcast video signal. Optically recognizable text, numbers, or visual barcodes representative of text or numbers are transmitted within various frames of broadcast video signals. The broadcast video signal is then received and selected video frames are captured, digitized and stored as Tagged Image File Format (TIFF) in response to a user initiated command. Barcode readers or optical character recognition processes are then utilized to extract textual or numeric data from the captured video frames and that data is stored for future utilization. In one depicted embodiment a user defined template may be utilized to assist the optical character recognition process. Thereafter, an associated communication device, such as a modem, is utilized to automatically "dial" a captured telephone number by generating a series of DTMF tones associated with the captured telephone number, automatically establishing communication between the data processing system and an external location.

16 Claims, 3 Drawing Sheets

METHOD AND SYSTEM COMMUNICATION ESTABLISHMENT UTILIZING CAPTURED AND PROCESSED VISUALLY PERCEPTIBLE DATA WITHIN A BROADCAST VIDEO SIGNAL

BACKGROUND OF THE INVENTION

1. Technical Field

The present invention relates in general to improved data processing systems and in particular to methods and systems for interfacing a data processing system and a video broadcast system. Still more particularly, the present invention relates to methods and systems for selectively capturing and storing textual or numeric information within broadcast video signals for subsequent utilization in communication establishment a data processing system.

2. Description of the Related Art

The state-of-the-art is advancing very rapidly in broadcast video systems. For example, interactive television systems are now commonly described in technical bulletins and disclosures which permit the viewer to interact with the broadcast signal on several levels. For example, bilateral communication is possible with certain cable television systems which permits a user to transmit purchase orders, survey responses, or other information back to a central data gathering point. Additionally, broadcast television systems are now proposed which permit a user to impact the eventual outcome of a broadcast play or a game by selecting various options at multiple points within the story line, and thereafter incorporating those selections into the utilization of a particular broadcast selection.

Additionally, techniques are now commonly utilized which permit the analog data representative of a frame of video image to be digitized and stored for subsequent utilization. This technique is commonly utilized to digitize images captured by a video camera for printing on articles of clothing or in more sophisticated systems for capturing information, such as stock market quotations, weather reports or other data for later utilization by the subscriber.

For example, Research Disclosure, January 1989, No. 297 by Kenneth Mason Publications Limited, England, describes a so-called "frame grabber" which captures an image from a television broadcast signal approximately every four seconds, digitizes that captured image, and then scans the capture image to interpret the image data for use in internal character and number form. This particular system is focused on the utilization of a small portion of the bottom of the video frame and is described as particularly useful in capturing stock market quotations which are typically broadcast in that portion of the screen.

Despite these advances in the ability of modern systems to interact with a broadcast video signal, the data thus captured must still be manually recalled and interpreted by a user. This is particularly cumbersome in situations in which telephone numbers, addresses, or electronic addresses are broadcast as part of a video signal and the user desires to capture that visually perceptible data and utilize that information to automatically establish communications via telephone or post office systems.

It should therefore be apparent that a need exists for a method and system whereby visually perceptible text or numeric data may be captured from a video broadcast signal, extracted and automatically utilized to establish communications in a data processing system.

SUMMARY OF THE INVENTION

It is therefore one object of the present invention to provide an improved data processing system.

It is another object of the present invention to provide an improved method and system for interfacing a data processing system with a video broadcast system.

It is yet another object of the present invention to provide an improved method and system for selectively capturing and storing textual or numeric information within broadcast video signals for subsequent utilization within a data processing system.

The foregoing objects are achieved as is now described. A method and system are disclosed for capturing and processing visually perceptible data, such as address or telephone numbers, within a broadcast video signal. Optically recognizable text, numbers, or visual barcodes representative of text or numbers are transmitted within various frames of broadcast video signals. The broadcast video signal is then received and selected video frames are captured, digitized and stored as Tagged Image File Format (TIFF) in response to a user initiated command. Barcode readers or optical character recognition processes are then utilized to extract textual or numeric data from the captured video frames and that data is stored for future utilization. In one depicted embodiment a user defined template may be utilized to assist the optical character recognition process. Thereafter, an associated communication device, such as a modem, is utilized to automatically "dial" a captured telephone number by generating a series of DTMF tones (commonly referred to as "touch tones") associated with the captured telephone number, automatically establishing communication between the data processing system and an external location.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
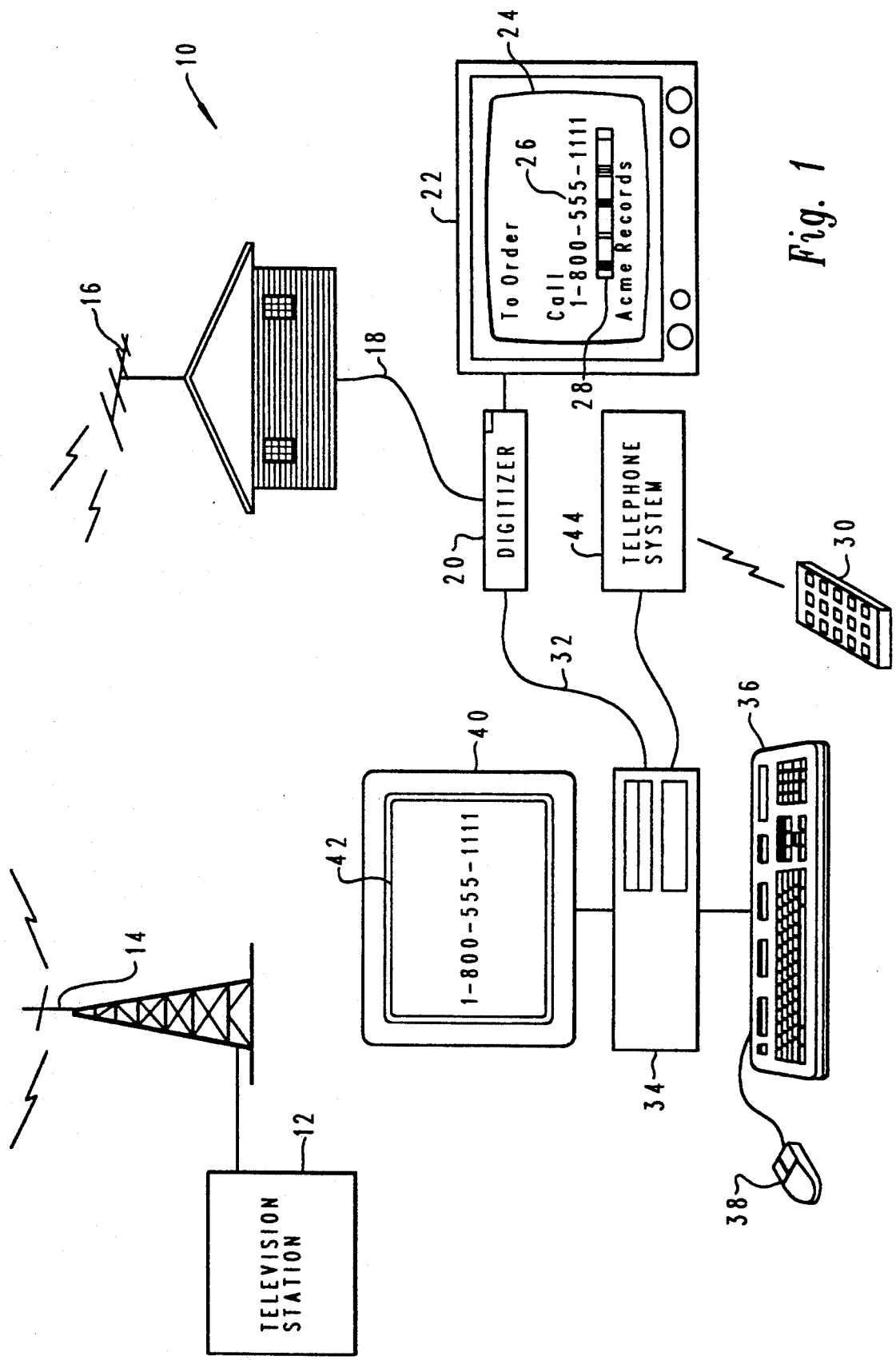
FIG. 1 is a partially schematic pictorial representation of a system which may be utilized to implement the method of the present invention.

With reference now to the figures and in particular with reference to FIG. 1, there is depicted a partially-schematic pictorial representation of a system 10 which may be utilized to implement the method of the present invention. As illustrated, system 10 includes a television station 12 which is utilized to broadcast a video signal which comprises a plurality of video frames, wherein at least certain of the plurality of video frames include visually perceptible data, such as text or numeric data. The video signal is broadcast utilizing well known traditional technology via broadcast antenna 14 and is thereafter received at reception antenna 16. Upon reception of a broadcast video signal at reception antenna 16, the analog broadcast video signal is coupled via digitizer 20 to television receiver 22. Television receiver 22, in a manner well known in the art, then produces a series of video frames which are displayed in the manner depicted within video display 24.

As illustrated within FIG. 1, video display 24 may include a plurality of textual and numeric information, such as telephone number 26 exposed as Arabic numerals or graphically, as barcode 28. Upon reference to the foregoing those skilled in the art will appreciate that the broadcasting of a telephone number, address, or other textual or numeric information is often accomplished utilizing television broadcast technology; however, there has not in the past existed any method or system whereby this information could be captured and utilized to automatically establish communication between a data processing system and an external location.

In a manner which will be explained in greater detail herein, digitizer 20 may be utilized, upon the reception of an initiating command from remote control 30, to capture and store a digital representation of a video display frame, such as that disclosed at reference numeral 24 within FIG. 1. The digital information representative of this video frame is then coupled, via cable 32 to data processing systems 34. Data processing system 34 may be implemented, as those skilled in the art will appreciate, utilizing any so-called "personal" computer, such as the International Business Machines Corporation PS/2 personal computer.

Data processing system 34 preferably includes a keyboard 36 and a pointing device, such as mouse 38 which may be utilized, in a manner which will be explained in greater detail herein, to assist in the capturing and processing of textual or numeric information from broadcast video signals. Also coupled to data processing system 34 is display device 40 which includes a display screen 42 which may be utilized to display captured and processed textual or numeric information in the manner depicted. Additionally, data processing system 34 may include a communications device, such as modem (not shown) which may be utilized to couple data processing system 34 to telephone system 44 in a manner well known to those having skill in this art.

Figure 2:
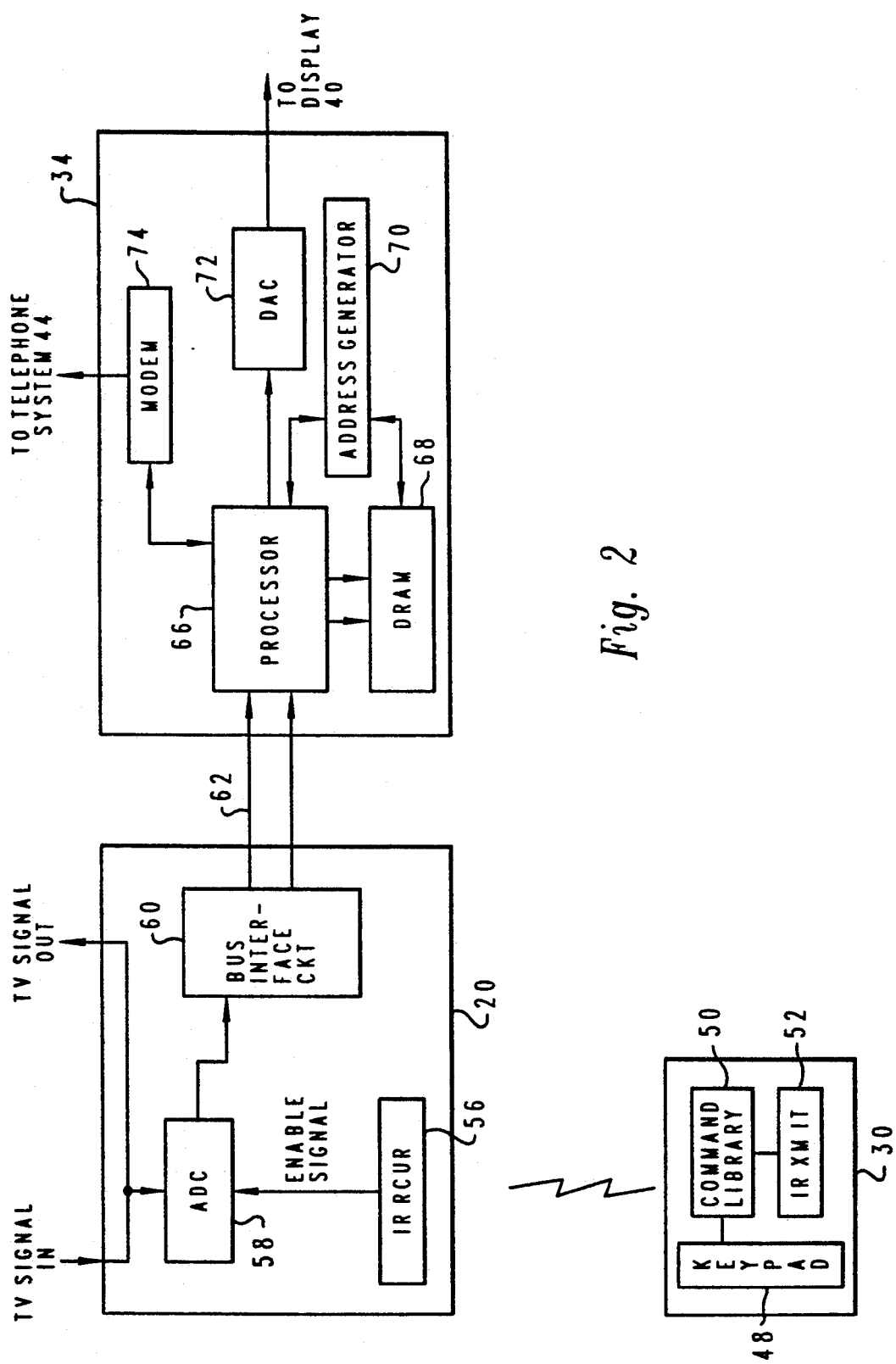
FIG. 2 is a high level block diagram illustrating various component subsystems of the system of FIG. 1.

Referring now to FIG. 2, there is depicted a high level block diagram illustrating various component subsystems of system 10 of FIG. 1. As illustrated, remote control 30 preferably includes a keypad 48 which is utilized to access various commands within command library 50. Command library 50 is coupled to infrared transmitter 52 and may be utilized to initiate the transmittal of a coded infrared transmission suitable for actuating digitizer 20, in a manner similar to that utilized to select various command and control functions in a modern state-of-the-art remote control television set. Of course, those skilled in the art will appreciate that remote control 30 may also be implemented utilizing ultrasonic technology or radio frequency technology, as a matter of design choice.

Digitizer 20 is also depicted within FIG. 2 and preferably includes an infrared receiver 56 capable of receiving transmitted commands from remote control 30. Infrared receiver 56 generates an ENABLE signal upon reception of an appropriate command from remote control 30 which is coupled to analog-to-digital converter 58. Analog-to-digital converter 58 is coupled to the television broadcast video signal which is received from reception antenna 16 (see FIG. 1) and which is coupled through digitizer 20 to television receiver 22. After capturing a digital representation of a selected frame of the broadcast video signal, that information is coupled, via bus interface circuit 60 and bus 62 to processor 66 within data processing system 34.

Referring to the block diagram of the components of data processing system 34 within FIG. 2, it may be seen that the digital representation of a particular frame of broadcast video signal may be stored by processor 66 within a memory component within data processing system 34. In the depicted embodiment of FIG. 2, processor 66 preferably stores the digital representation of the broadcast video frame within Dynamic Random Access Memory (DRAM) 68. Address generator 70 is utilized to control the storage and retrieval of this information within memory 68, and may be utilized to repetitively retrieve the digital representation of the broadcast video signal frame stored within memory 68 and couple that representation to display 40 via digital-to-analog converter 72. In this manner, a "still" representation of a broadcast video frame may be repetitively displayed within display 40, permitting the user to visually access any data contained therein and edit and/or correct the textual or numeric data within that frame of broadcast video signal which has been captured in a manner which will be explained in greater detail herein.

Additionally, in accordance with an important feature of the present invention, data processing system 34 preferably includes a modem 74. Modem 74 may be utilized, as those skilled in the art will appreciate, to automatically establish communication between data processing system 34 and an external location via telephone system 44. Thus, after capturing textual or numeric data within a broadcast video frame which includes, for example, a telephone number, processor 66 may be utilized to initiate communication between data processing system 34 and an external location by causing modem 74 to generate a series of DTMF tones (commonly referred to as "touch tones") which correspond to the captured digits of the telephone number.

Thus, when utilizing the method and system of the present invention, a user may remotely initiate the capturing of a frame of video data which includes textual or numeric information and may cause that frame of data to be stored for subsequent utilization. The captured frame of data, along with textual or numeric data which may have been extracted from that frame, may be recalled from memory 68 utilizing processor 66 in any manner acceptable within modern state-of-the-art data processing systems and utilized, in the novel manner set forth herein, to automatically establish communication between data processing system 34 and an external location. Additionally, as those skilled in the art will appreciate, voice communication may be established between a data processing system user and an external location by merely utilizing modem 74 as an automatic dialer.

Figure 3:
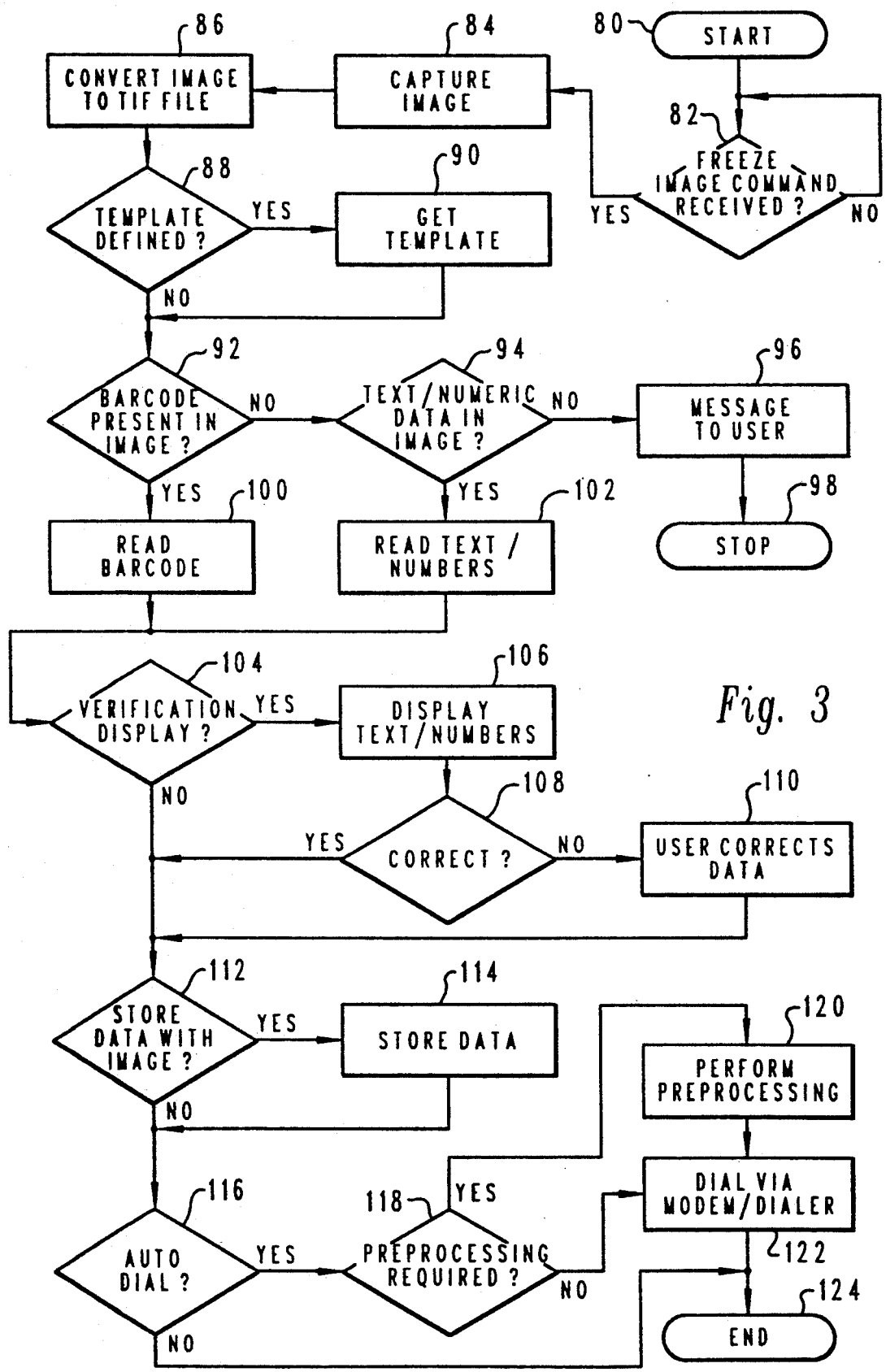
FIG. 3 is a high level logic flowchart illustrating the method of the present invention.

With reference now to FIG. 3, there is depicted a high level logic flowchart which illustrates the method of the present invention. As depicted, this process begins at block 80 and thereafter passes to block 82 which illustrates a determination of whether or not a freeze image command has been received by digitizer 20 from remote control 30. If not, the process merely iterates until such time as a freeze image command has been received. After receiving a freeze image command, as determined at block 82, the process passes to block 84. Block 84 illustrates the capturing and storing of a digital representation of at least one video frame within a received broadcast video signal. Thereafter, that image is converted to a Tagged Image File Format (TIFF) and stored for future processing, as depicted at block 86.

Next, the process passes to block 88. Block 88 illustrates a determination of whether or not the user has defined a template for utilization in the extraction of textual or numeric data from the captured video frame described above. Those skilled in the art will appreciate that the user may define specific numeric templates, such as a template beginning "1-800-_-_" which may be utilized to increase the efficiency of an optical character recognition process by further defining the numeric data which is to be extracted from a video frame. Additionally, a specific barcode frame may also be defined and utilized, in a manner well known to those skilled in the barcode reader art, to facilitate the scanning and extraction of barcodes from within a video frame in the captured portion of the broadcast video signal.

In the event a template has been defined by the user, the process passes to block 90 which illustrates the retrieval of that template from system memory. Thereafter, or in the event no template has been defined, the process passes to block 92. Block 92 illustrates a determination of whether or not a barcode is present within the captured video frame. If so, the process passes to block 100 which illustrates the reading of that barcode utilizing well known barcode scanning processes. Referring again to block 92 in the event no barcode is present within the captured video frame, the process passes to block 94.

Block 94 illustrates a determination of whether or not textual or numeric data is present within the captured video frame, and if not, the process passes to block 96 which illustrates the generation of a message to the user, via data processing system 34, indicating that no barcode, textual or numeric data was present within the captured video frame. Thereafter, as illustrated at block 98, the process terminates.

Referring again to block 94, in the event numeric or textual data is present within the captured video frame, the process passes to block 102. Block 102 illustrates the reading of the textual and/or numeric data utilizing any well known optical character recognition process. As may be appreciated by those having skill in this art, a user may utilize mouse 38, or any other suitable means, to graphically depict a particular region of a video frame for optimal character recognition, greatly enhancing the efficiency of the process. Thereafter, after either reading a barcode within the captured video frame or utilizing an optical character recognition process to extract text and/or numeric data from the captured video frame the process passes to block 104.

Block 104 illustrates a determination of whether or not a verification display of the captured video frame is desired. If so, the process passes to block 106 which depicts the display of the extracted text and/or numeric information from the captured video frame and the process then passes to block 108. Block 108 illustrates a determination of whether or not the extracted textual and/or numeric data is correct and if not, the process passes to block 110. Block 110 illustrates the correction of the captured textual and/or numeric data by the user utilizing mouse 38 and/or keyboard 36 of data processing system 34 (see FIG. 1) in a manner well known in the art. For example, a user may select a particular numeral and automatically increment or decrement that numeral to provide correction.

Thereafter, after either correcting the extracted textual and/or numeric data, determining that the extracted textual and/or numeric data was correct, or after declining a verification display of the extracted textual and/or numeric data, as determined at block 104, the process passes to block 112. Block 112 illustrates a determination of whether or not the user desires to store the extracted data with the stored video image corresponding to the captured video frame and if so, the process passes to block 114.

Block 114 illustrates the storing of the extracted textual and/or numeric data with the image and thereafter, or after declining to store the extracted textual and/or numeric data with the image, the process passes to block 116. Block 116 illustrates an important feature of the present invention and depicts a determination of whether or not the user has specified an auto dial process. If an auto dial process has been selected, as determined at block 116, the process passes to block 118, which illustrates a determination of whether or not preprocessing of the telephone number is required. For example, appending a password, local access number or prefix to the extracted telephone number may be necessary or desired. If processing is necessary or desired, the process passes to block 120 which illustrates the preprocessing of the telephone number and thereafter, or in the event no preprocessing is necessary, the process passes to block 122. Block 122 depicts the dialing of an extracted telephone number from a captured video frame utilizing a modem or dialer device. Thereafter, or after declining to utilize the auto dial function, as determined at block 116, the process passes to block 120 and terminates.

Upon reference to the foregoing those skilled in the art will appreciate that the applicants herein have create a novel method and system whereby visually perceptible data within a broadcast video signal, such as textual and/or numeric data, may be captured by digitizing a selected video frame within the broadcast video signal and thereafter extracting textual and/or numeric data from that video frame, utilizing optical character recognition processes or barcode scanning techniques, in the event a barcode is transmitted in association with the broadcast video signal. That information is then extracted from the captured video frame and stored, in conjunction with the captured video frame, to permit a user of data processing system 34 to automatically initiate communications between data processing system 34 and an external location.

Thus, a user viewing a broadcast video signal from a local television station may, utilizing a remote control, such as remote control 30, initiate the capture of a particular frame of video data and assure himself or herself that important textual and/or numeric information within that frame, such as an address or telephone number, is captured and stored within data processing system 34 and, may be utilized to automatically initiate communication between the user and an external location.

While the invention has been particularly shown and described with reference to a preferred embodiment, it will be understood by those skilled in the art that various changes in form and detail may be made therein without departing from the spirit and scope of the invention.

We claim:

1. A method for capturing and processing visually perceptible data within broadcast video signals, said method comprising the steps of:
   transmitting a broadcast video signal comprising a plurality of video frames, wherein at least certain of said plurality of video frames include visually perceptible data;
   receiving said broadcast video signal utilizing a television receiver;
   selectively capturing and storing within a data processing system coupled to said television receiver at least one video frame within said received broadcast video signal which includes visually perceptible data within;
   processing said stored at least one video frame within said data processing system to extract said visually perceptible data; and
   utilizing said extracted visually perceptible data to automatically establish communication between said data processing system and an external location.

2. The method for capturing and processing visually perceptible data within broadcast video signals according to claim 1, wherein said step of transmitting a broadcast video signal comprising a plurality of video frames wherein at least certain of said plurality of video frames include visually perceptible data further comprises the step of transmitting a broadcast video signal comprising a plurality of video frames wherein at least certain of said plurality of video frames include an optically recognizable telephone number.

3. The method for capturing and processing visually perceptible data within broadcast video signals according to claim 2, wherein said step of processing said stored at least one video frame to extract said visually perceptible data comprises the step of scanning said stored at least one video frame utilizing an optical character recognition process to extract said telephone number from said stored at least one video frame.

4. The method for capturing and processing visually perceptible data within broadcast video signals according to claim 3, wherein said step of utilizing said extracted visually perceptible data to automatically establish communications between said data processing system and an external location comprises the step of selectively generating a series of DTMF tones corresponding to said telephone number to be utilized to establish telephone communication between said data processing system and an external location.

5. The method for capturing and processing visually perceptible data within broadcast video signals according to claim 1, wherein said step of transmitting a broadcast video signal comprising a plurality of video frames wherein at least certain of said plurality of video frames include visually perceptible data further comprises the step of transmitting a broadcast video signal comprising a plurality of video frames wherein at least certain of said plurality of video frames include visually perceptible data comprising a visual barcode corresponding to a telephone number.

6. The method for capturing and processing visually perceptible data within broadcast video signals according to claim 5, wherein said step of processing said stored at least one video frame to extract said visually perceptible data comprises the step of scanning said stored at least one video frame utilizing a barcode reader process to extract said telephone number, from said stored at least one video frame.

7. The method for capturing and processing visually perceptible data within broadcast video signals according to claim 6, wherein said step of utilizing said extracted visually perceptible data to automatically establish communications between said data processing system and an external location comprises the step of selectively generating a series of DTMF tones corresponding to said telephone number to be utilized to establish telephone communication between said data processing system and an external location.

8. A system for capturing and processing visually perceptible data within broadcast video signals, said system comprising:
   transmission means for transmitting a broadcast video signal comprising a plurality of video frames, wherein at least certain of said plurality of video frames include visually perceptible data;
   television receiver means for receiving said broadcast video signal;
   frame capture means coupled to said television receiver means for selectively capturing and storing at least one video frame within said received broadcast video signal which includes visually perceptible data;
   processing means coupled to said frame capture means for extracting said visually perceptible data from said stored at least one video frame; and
   communication means coupled to said processing means for utilizing said extracted visually perceptible data to automatically establish communication between said system and an external location.

9. The system for capturing and processing visually perceptible data within broadcast video signals according to claim 8, wherein said visually perceptible data comprises an optically recognizable telephone number.

10. The system for capturing and processing visually perceptible data within broadcast video signals according to claim 9, wherein said processing means comprises an optical character recognition process for extracting said telephone number from said stored at least one video frame.

11. The system for capturing and processing visually perceptible data within broadcast video signals according to claim 10, wherein said communication means includes means for generating DTMF tones corresponding to said telephone number.

12. The system for capturing and processing visually perceptible data within broadcast video signals according to claim 8, wherein said visually perceptible data comprises a visual barcode which corresponds to a telephone number.

13. The system for capturing and processing visually perceptible data within broadcast video signals according to claim 12, wherein said processing means comprises a barcode reader for reading said visual barcode and extracting said telephone number from said stored at least one video frame.

14. The system for capturing and processing visually perceptible data within broadcast video signals according to claim 13, wherein said communication means includes means for generating DTMF tones corresponding to said telephone number.

15. The system for capturing and processing visually perceptible data within broadcast video signals according to claim 8, further including remote control means for selectively actuating said frame capture means.

16. The system for capturing and processing visually perceptible data within broadcast video signals according to claim 15, wherein said remote control means comprises an infrared transmitter for transmitting a plurality of command sequences wherein at least one of said plurality of command sequences comprises a command sequence for actuating said frame capture means.

* * * * *